(12) United States Patent
Umeno et al.

(10) Patent No.: US 7,889,298 B2
(45) Date of Patent: Feb. 15, 2011

(54) TRANSPARENT CONDUCTIVE FILM, AND SUBSTRATE, ELECTRONIC DEVICE AND LIQUID CRYSTAL DISPLAY USING THE SAME

(75) Inventors: Satoshi Umeno, Sodegaura (JP); Akira Kaijo, Sodegaura (JP); Kazuyoshi Inoue, Sodegaura (JP); Nobuo Tanaka, Sodegaura (JP); Tokie Tanaka, legal representative, Sodegaura (JP)

(73) Assignee: Idemitsu Kosan Co. Ltd., Tokyo (JP)

( * ) Notice: Subject to any disclaimer, the term of this patent is extended or adjusted under 35 U.S.C. 154(b) by 346 days.

(21) Appl. No.: 12/094,337

(22) PCT Filed: Oct. 31, 2006

(86) PCT No.: PCT/JP2006/321697

§ 371 (c)(1),
(2), (4) Date: May 20, 2008

(87) PCT Pub. No.: WO2007/058066

PCT Pub. Date: May 24, 2007

(65) Prior Publication Data

US 2010/0053523 A1    Mar. 4, 2010

(30) Foreign Application Priority Data

Nov. 21, 2005    (JP)    ............... 2005-335386

(51) Int. Cl.
G02F 1/1333 (2006.01)
H01B 1/08 (2006.01)
H05K 1/09 (2006.01)
B05D 5/12 (2006.01)

(52) U.S. Cl. ............... 349/122; 349/139; 349/140; 174/126.1; 174/257; 427/99.1

(58) Field of Classification Search ............ 349/122, 349/187, 139, 140; 174/126.1, 257; 427/99.2
See application file for complete search history.

(56) References Cited

U.S. PATENT DOCUMENTS

| | | | | |
|---|---|---|---|---|
| 5,667,853 | A * | 9/1997 | Fukuyoshi et al. | ......... 428/1.62 |
| 6,533,965 | B1 | 3/2003 | Sasaki et al. | |
| 6,794,220 | B2 * | 9/2004 | Hirai et al. | ............... 438/99 |
| 6,917,402 | B2 * | 7/2005 | Hosoda et al. | ............... 349/111 |

(Continued)

FOREIGN PATENT DOCUMENTS

EP    1 722 377 A1    11/2006

(Continued)

OTHER PUBLICATIONS

Supplementary European Search Report of EP 06 822 626.5 (Aug. 31, 2009).

(Continued)

*Primary Examiner*—Brian M Healy
(74) *Attorney, Agent, or Firm*—Millen, White, Zelano & Branigan, P.C.

(57) ABSTRACT

A transparent conductive film including an indium oxide, a tin oxide and at least one lanthanoid metal oxide, the film including a portion connected to a conductor, and at least the connection portion having crystallinity.

20 Claims, 12 Drawing Sheets

U.S. PATENT DOCUMENTS

| | | | |
|---|---|---|---|
| 7,306,861 B2 * | 12/2007 | Inoue et al. | 428/702 |
| 7,612,850 B2 | 11/2009 | Inoue et al. | |
| 2003/0076472 A1 * | 4/2003 | Hosoda et al. | 349/158 |
| 2005/0068648 A1 * | 3/2005 | Yoshikai et al. | 359/883 |
| 2008/0239217 A1 | 10/2008 | Inoue et al. | |
| 2010/0053523 A1 * | 3/2010 | Umeno et al. | 349/122 |
| 2010/0136869 A1 * | 6/2010 | Aoki et al. | 445/24 |
| 2010/0170696 A1 * | 7/2010 | Yano et al. | 174/126.2 |

FOREIGN PATENT DOCUMENTS

| | | |
|---|---|---|
| EP | 1 724 790 A1 | 11/2006 |
| JP | 2001-155549 A | 6/2001 |
| JP | 2004-030934 A | 1/2004 |
| JP | 2004-241296 A | 8/2004 |
| JP | 2005-302356 A | 10/2005 |
| JP | 2005-302469 A | 10/2005 |
| WO | WO-2005 086179 | 9/2005 |

OTHER PUBLICATIONS

Office Action for Chinese Patent Application No. 200680043207 issued Sep. 21, 2010.

English Translation of Office Action for Chinese Patent Application No. 200680043207 issued Sep. 21, 2010.

\* cited by examiner

TRANSPARENT CONDUCTIVE FILM, AND SUBSTRATE, ELECTRONIC DEVICE AND LIQUID CRYSTAL DISPLAY USING THE SAME

This application is a continuation of PCT/JP2006/321697, filed Oct. 31, 2006.

TECHNICAL FIELD

The invention relates to a transparent conductive film which can be etched readily with a weak acid, is excellent in precision workability and has a low connection resistance. The invention also relates to a substrate, an electronic device and a liquid crystal display using the transparent conductive film.

BACKGROUND

An indium tin oxide (ITO) film is widely known as a transparent conductive film used as an electrode circuit, a pixel electrode or the like in a liquid crystal display. Among these indium tin oxide films, an indium tin oxide film which is in the polycrystalline state obtained by heating has a satisfactorily low resistance of about $200 \times 10^{-6}$ Ω·cm. Thus, the film has low resistance and high light transmittance that are required for conductors for liquid crystal displays. For contact resistance when chip-on-glass (COG) is performed, the indium tin oxide film has excellent low connection resistance without causing any problems. In order to form a circuit or a pixel electrode by etching such an indium tin oxide film, strong acid etchants, such as a mixture of HCl and $HNO_3$ and a mixture of HCl and $H_2SO_4$, are required. However, if indium tin oxide films are etched using such a strong acid as an etchant, the amount of side etching increases, leading to difficulty in precision working.

Furthermore, since liquid crystal displays have been increasingly miniaturized year by year, in sections other than electrodes or wiring composed of an indium tin oxide film, in which the resistance must be further decreased, wiring composed of copper has been used instead of the conventional wiring composed of chromium or tantalum. However, the above-mentioned strong acid etchants used for etching indium tin oxide films exhibit significantly high etching performance for copper wiring. Since indium tin oxide films and copper significantly differ in etching rate and the amount of side etching is large, the copper wiring may become disconnected if strong acids used for etching indium tin oxide films are used. Conversely, it is impossible to etch indium tin oxide films with diluted hydrochloric acid or organic acids which have low etching performance for copper wiring.

A technique is known in which indium tin oxide films in the amorphous state are obtained by a specific production method. The indium tin oxide film in the amorphous state is known to be capable of being etched using an organic acid. Indium tin oxide films in the amorphous state have such a disadvantage that they have a high contact resistance. If the indium tin oxide film is formed at room temperature, it tends to have a microcrystalline structure, and the resistance is increased to about $1,000 \times 10^{-6}$ Ω·cm. Therefore, a problem arises in which satisfactory connection resistance may not be obtained.

Under such circumstances, as the transparent conductive film replacing indium tin oxide films, indium zinc oxide (IZO) films have attracted attention. The indium zinc oxide (IZO) films are known as superior transparent conductive films suited for precision working since they exhibit a low resistance value at around $400 \times 10^{-6}$ Ω·cm even if formed at room temperature, have light transmittance almost equal to that of indium tin oxide films, can be etched with a weak acid, and the amount of side etching is small when etching is conducted with a weak acid. Furthermore, if indium zinc oxide films are used, dilute hydrochloric acid can be selected as an etchant which does not erode copper wiring. By using dilute hydrochloric acid, precision working can be achieved even if a circuit structure combining an indium zinc oxide film and copper wiring is used.

However, if the indium zinc oxide film is used as wiring for the above-mentioned liquid crystal display, and the wiring is COG connected, the connection resistance increases, giving rise to a problem when wiring in liquid crystal displays is further miniaturized. In addition, if indium zinc oxide films are stored in air, contact resistance may increase with the passage of time.

However, when the indium zinc oxide film is used for TCP (tape carrier package) connection, problems similar to those mentioned above may occur. To solve these problems, a transparent conductive film formed of indium tin zinc oxide is proposed in Patent document 1.

Patent document 1: JP-A-2001-155549

The invention has been made in view of the above problems, and an object thereof is to provide a transparent conductive film which can be fine etched using weak acids, has a low connection resistance, and superior light transmittance, of which the resistance can also be low when COG connection is performed, and the resistance does not vary with the passage of time.

Another object of the invention is to provide a substrate an electronic device, and a liquid crystal display, provided with the above-mentioned transparent conductive film.

Still another object of the invention is to provide a method for producing the above-mentioned substrate.

SUMMARY OF THE INVENTION

The invention provides a transparent conductive film comprising an indium oxide, a tin oxide and at least one type of lanthanoid metal oxide, in which at least a portion for connection to a conductor has crystallinity.

In such a transparent conductive film, as a conductive mechanism of an indium tin lanthanoid metal oxide, in addition to a conductive mechanism in which excess indium of indium oxide produces electron carriers, a conductive mechanism in which tetravalent tin is activated to increase electron carriers by adding tin as an n-type dopant to indium can function effectively. Reaction with moisture in air is suppressed. As a result, the film can realize good low resistance connection. By addition of a lanthanoid metal oxide, it is possible to form a film in an amorphous state, to easily crystallize at least part of the formed film, and ensures excellent conductivity by increasing electron carriers by tin. In addition, reaction with moisture, oxygen or organic substances in air can be suppressed.

Since this transparent conductive oxide film can be easily etched by weak acids such as diluted hydrochloric acid and organic acids and the side etching amount thereof is small, finer wiring working thereof becomes possible. Furthermore, since this transparent conductive oxide film can be etched with weak acids, even if used in combination with the structure provided with copper wiring, it is possible to conduct etching treatment without eroding the copper wiring. As a result, not only the etching process is facilitated but also the freedom of circuit configuration design combining copper wiring and the transparent conductive film wiring is improved.

The lanthanoid metal oxide contained in the transparent conductive film of the invention is preferably a cerium oxide and/or a samarium oxide. When the lanthanoid metal oxide is a cerium oxide and/or a samarium oxide, the transparent conductive film of the invention is a conductive film formed by using a sputtering target composed of a metal oxide which has the following metal component ratios in terms of atomic %:

In/(In+Sn+Ce(and/or Sm))=0.6 to 0.969

Sn/(In+Sn+Ce(and/or Sm))=0.03 to 0.2

Ce(and/or Sm)=(In+Sn+Ce(and/or Sm))=0.001 to 0.2

The electronic device of the invention is provided with the above-mentioned transparent conductive film as at least part of an electronic circuit. Due to such a configuration, an electronic device provided with a transparent conductive film having the above-mentioned properties can be provided.

The transparent-conductive-film-formed substrate of the invention is formed by providing the above-mentioned transparent conductive film on a substrate. Due to such a configuration, a transparent-conductive-film-formed substrate having the above-mentioned properties can be provided.

The method for producing the transparent-conductive-film-formed substrate of the invention is characterized by forming an amorphous transparent conductive film comprising an indium oxide, a tin oxide and at least one lanthanoid metal oxide, and subjecting the amorphous transparent conductive film to thermal treatment to crystallize at least part of the amorphous transparent conductive film.

After crystallization, the transparent conductive film can be connected to other conductors with a low resistance. Therefore, a transparent-conductive-film-formed substrate provided with wiring enabling good connection even if the wiring is in a fine circuit can be provided.

The liquid crystal display of the invention is a liquid crystal display having a liquid crystal between a pair of opposing substrates, in which at least one of the pair of substrates is the above-mentioned transparent-conductive-film-formed substrate. By this configuration, a liquid crystal display provided with the transparent-conductive-film-formed substrate having the above-mentioned properties can be provided.

The invention provides a transparent conductive film capable of being etched in a fine pattern with a weak acid, having a low connection resistance, and a high light transmittance, of which the resistance can be low when COG connection is performed and the resistance value hardly varies with the passage of time.

The invention provides an electronic device provided with wiring capable of being connected to other components with a low resistance even if the wiring is fine, suffering from only a smaller degree of deterioration of connection resistance even if left in air, capable of being etched with weak acids, and capable of being fine patterned.

The invention provides a transparent-conductive-film-formed substrate with wiring capable of attaining a good connection even in a fine circuit.

The invention provides a liquid crystal display provided with wiring capable of attaining connection with a low connection resistance at a wiring connection portion.

The invention provides a method for producing the transparent-conductive-film-formed substrate.

The invention provides a liquid crystal display having a wiring connection portion with a low connection resistance even if the wiring is in a fine circuit.

BEST MODE FOR CARRYING OUT THE INVENTION

Figure 1:
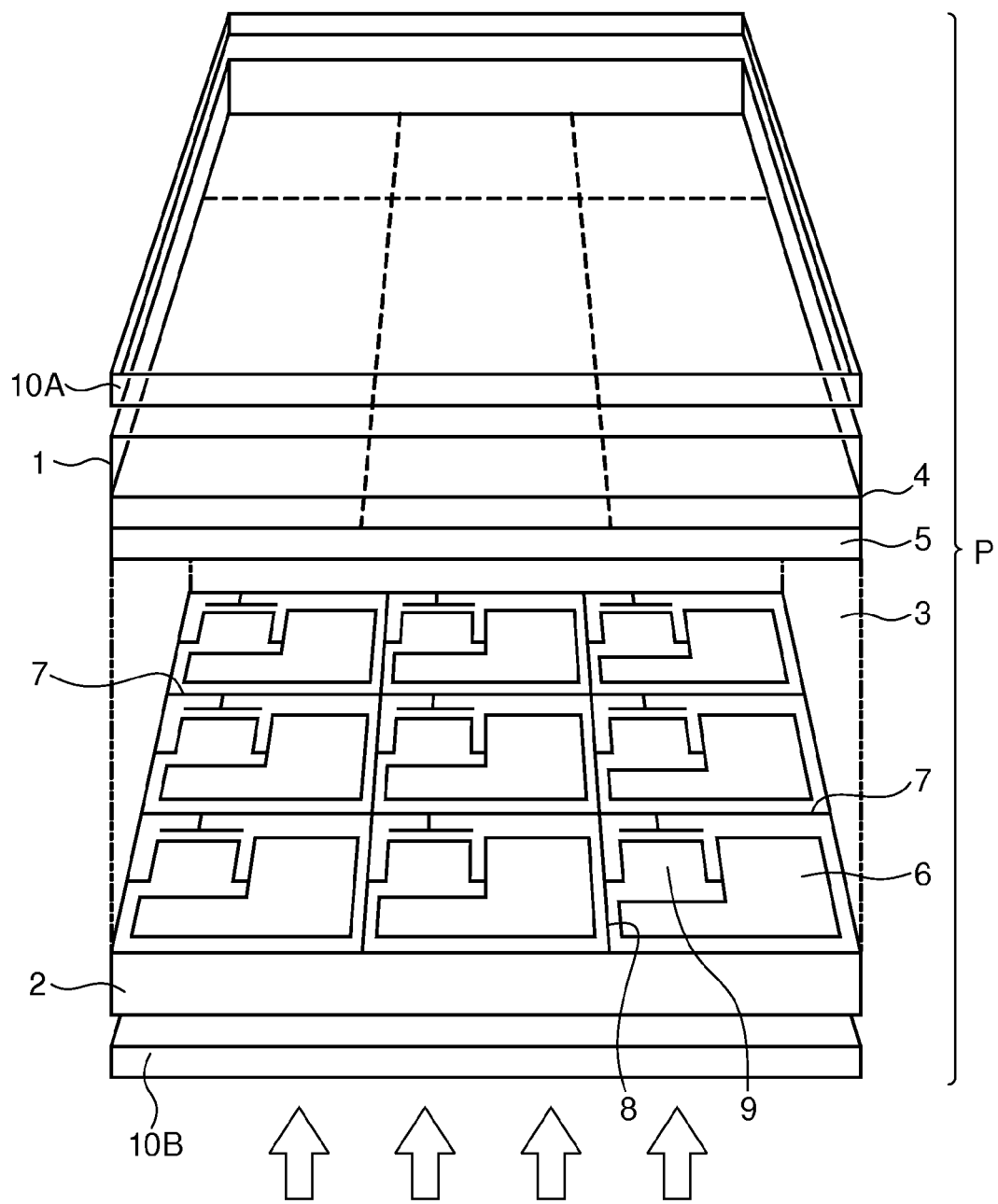
FIG. 1 is a schematic view showing a liquid crystal panel provided with the transparent conductive film of the invention.

The transparent conductive film of the invention contains an indium (In) oxide ($In_2O_3$), a tin (Sn) oxide ($SnO_2$) and a lanthanoid metal oxide. In addition to these oxides, the transparent conductive film of the invention may further contain impurities such as Mg, Ca, B, Al, Ga, and Ge in an amount of about several atomic %.

One or more lanthanoid metal oxides may be used. For example, a cerium oxide, a samarium oxide or the like may be preferably be used.

The sputtering target for forming the transparent conductive film may preferably contain the indium oxide as a main component in an amount of 60 atomic % to 96.9 atomic % with respect to all metal components, more preferably, in an amount of 70 atomic % to 95 atomic %. The target may preferably contain a tin oxide in an amount of 3 atomic % to 20 atomic %, more preferably in an amount of 5 atomic % to 15 atomic %. The target may contain a lanthanoid metal oxide in an amount of 0.1 atomic % to 20 atomic %.

Excessive indium that is not bonded to oxygen in the transparent conductive film produces electron carriers and constitutes an oxygen-defective type conductivity mechanism. A tin oxide as an addition component is important because tetravalent tin is activated in the transparent conductive film to produce electron carriers.

The transparent conductive film has a connection portion for connecting to other wiring or conductor, and this portion has crystallinity. For example, when a surface portion of the transparent conductive film is connected to wiring or another conductor, the surface portion exhibits crystallinity. That is, when the transparent conductive film of the invention is practically used for wiring, it is preferred that at least a connection portion with other wiring or terminal be crystalline. The transparent conductive film preferably has a crystallization temperature of 160 to 300° C.

The above transparent conductive film is amorphous as ordinarily formed. If the film is subjected to an annealing treatment in which heating is conducted to the crystallization temperature or higher (thermal treatment of heating to 160° C. to 300° C.), the film is easily crystallized. The thermal treatment temperature can be selected depending on thermal resistance temperatures of surrounding circuits and substrates. If the film is used for liquid crystal panels described later, in view of thermal resistance temperatures of surrounding circuits and substrate, 250° C. or less may be preferable, with about 200° C. being more preferable.

The transparent conductive film of the invention in the amorphous state as formed has a high contact resistance (about 41 Ω) with COG, which is not a suitable resistance for fine wiring connection. However, the resistance of at least a connection portion can be lowered (about 2.3 Ω) by crystallization of at least the surface portion (about 50 Å deep from the surface) due to thermal treatment. The atmosphere of thermal treatment for crystallization may be air, $N_2$ atmosphere, 20% $H_2$ and 80% $N_2$, 20% $O_2$ and 80% $N_2$ or a vacuum. The connection resistance of crystallized transparent conductive film does not increase with the passage of time since the crystallized film is prevented from bonding to water (or oxygen) in the air. The above-mentioned amorphous transparent conductive film can be easily etched with a weak acid such as diluted hydrochloric acid and organic acids. Therefore, the film is preferably etched and patterned to form wiring as it is a transparent conductive film in the amorphous state. After the patterning, necessary parts such as wiring connection portions are thermally treated to lower the resistance, thereby enabling low-resistance connection even in fine-circuit connection portions.

The transparent conductive film of the invention can be used as a transparent electrode. The transparent electrode may have an edge formed by etching with an etchant containing oxalic acid. The edge preferably has a taper angle of 30 to 89 degrees, more preferably 35 to 89 degrees, particularly preferably 40 to 85 degrees.

The taper angle can be controlled by the etchant concentration and the etching temperature. The etching temperature is preferably 15° C. to 55° C., particularly preferably 25° C. to 45° C. If the etching temperature is lower than 15° C., the etching rate may be slow or equipment may suffer from the formation of dew condensation. If higher than 55° C., moisture may vaporize to change the concentration.

The transparent conductive film and the transparent electrode of the invention may be provided not only on inorganic materials such as glass and inorganic insulative films but also on an organic substrate or an organic film. In the transparent conductive film and the transparent electrode of the invention on an organic substrate or an organic film, crystalline non-uniformity hardly occur, unlike crystalline films such as polycrystalline ITO. They are thus preferred as a transparent conductive film and transparent electrode used on an organic substrate and organic film.

The above-mentioned transparent conductive film may be used as at least part of an electric circuit of a liquid crystal display, an organic or inorganic EL display, a plasma display panel (PDP) display, a surface-conduction electron emitter (SED) display, or other displays.

When the transparent conductive film is used in a liquid crystal display, the above-mentioned transparent-conductive-film-formed substrate may be used as one of the pair of substrates sandwiching a liquid crystal therebetween. Both substrates may be formed of the transparent-conductive-film-formed substrate.

The transparent-conductive-film-formed substrate of the invention can be formed by the following method:

First, an amorphous transparent conductive film comprising an indium oxide, a tin oxide and at least one lanthanoid metal oxide is formed on a substrate. Examples of the method for forming the film include sputtering using a target comprising an indium oxide, a tin oxide and at least one lanthanoid metal oxide, application of slurry obtained by suspending the oxides in water or an organic solvent or application of a solution of precursors of the oxides. Next, at least part of the amorphous transparent conductive film is subjected to thermal treatment for crystallization. The conditions or the like of the thermal treatment are as mentioned above.

Before or after the thermal treatment, the transparent conductive film may be patterned. It is preferred that patterning be performed before the thermal treatment since the film in the amorphous state can be patterned readily.

Figure 2:
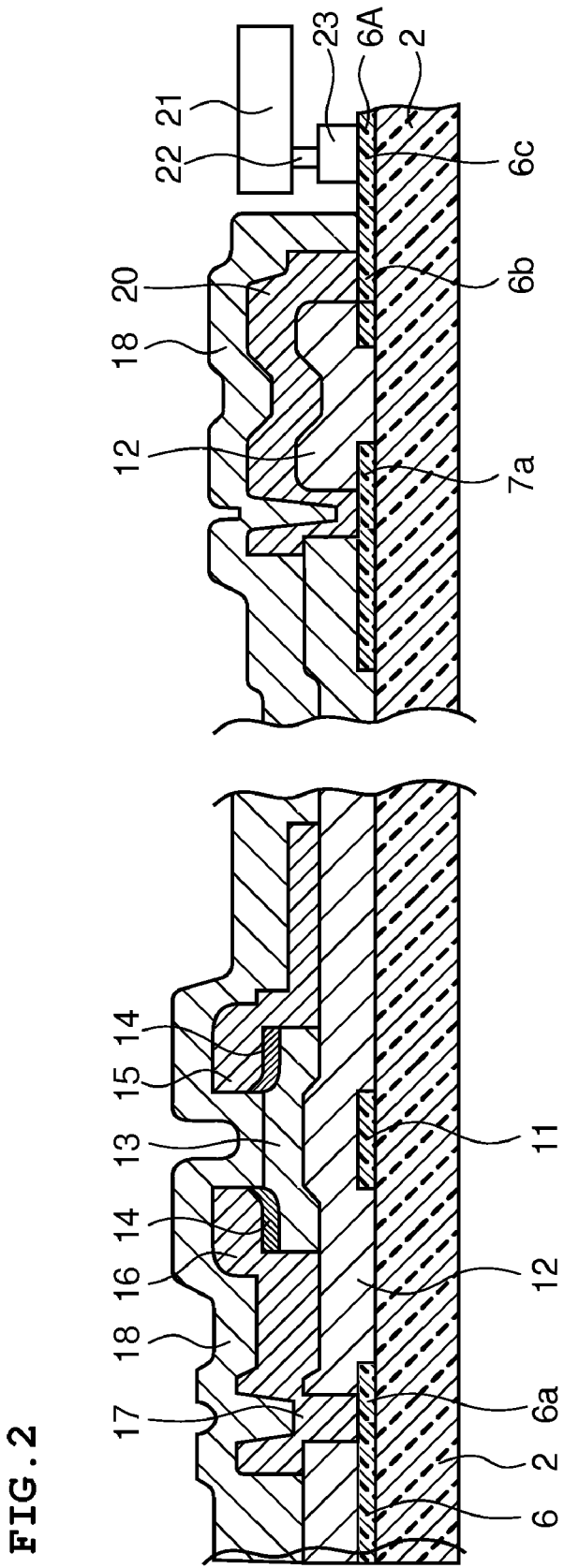
FIG. 2 is a cross-sectional view showing a thin-film transistor and a gate terminal of a first example to be provided in the liquid crystal panel shown in FIG. 1.
Figure 3:
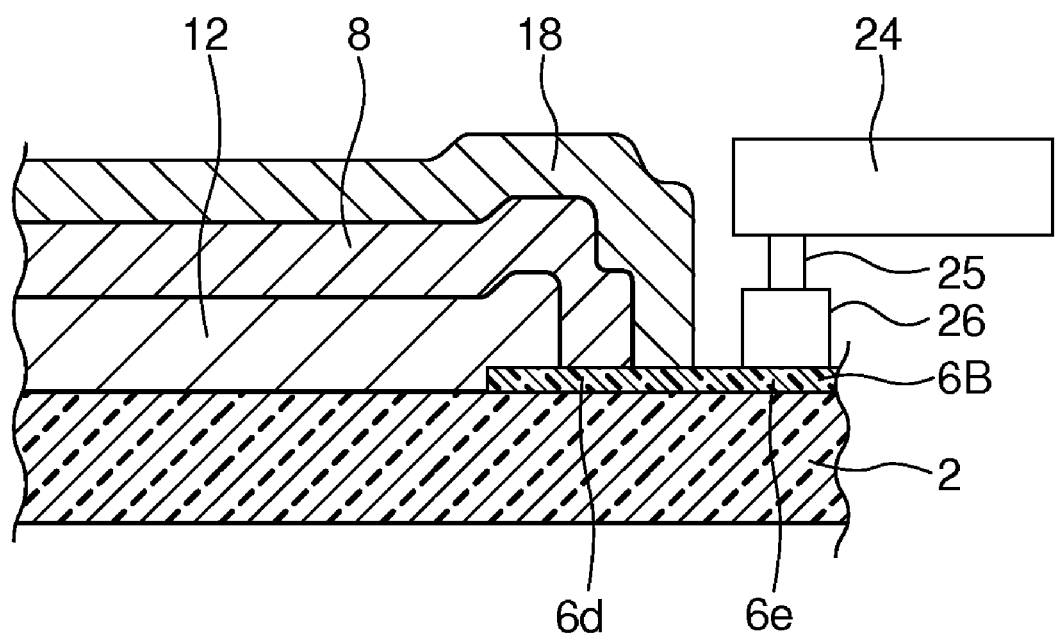
FIG. 3 is a sectional view showing a source terminal of the first example to be provided in the liquid crystal panel shown in FIG. 1.

FIGS. 1 through 3 each show one example of an active matrix liquid crystal panel (electronic device) fabricated using the transparent conductive film of the invention. A liquid crystal panel P in this example has a structure in which a liquid crystal 3 is sealed between transparent upper and lower substrates 1 and 2 opposed to each other. A color filter 4 and a common electrode 5 formed of the transparent conductive film having the above-mentioned composition are formed on the liquid crystal side of the upper substrate 1, and a plurality of pixel electrodes 6 composed of the transparent conductive film having the above-mentioned composition are formed in line vertically and laterally on the upper surface of the lower substrate 2. Gate wirings 7 and source wirings 8, which are composed of a conductive metallic material, such as copper, are arrayed in the form of a matrix in regions between the pixel electrodes 6 on the upper surface of the lower substrate 2. The pixel electrode 6 is disposed in the region surrounded by the gate wirings 7 and the source wirings 8, and thin film transistors (TFT) 9, serving as a switching element for connecting the individual pixel electrodes 6 to the gate wirings 7 or the source wirings 8, are formed in this region. Furthermore, as shown in FIG. 1, polarizers 10A and 10B are disposed on the upper side of the substrate 1 and the lower side of the substrate 2, respectively.

In addition, although the liquid crystal panel P shown in FIG. 1 has only pixel electrodes 6 in 3 columns and 3 rows, in the actual liquid crystal panel, pixels in several hundred columns and several hundred rows are provided as effective display pixels, and pixel electrodes 6 in accordance with the number of the pixels are provided. Although connecting terminal sections are provided in connecting sections of the gate wirings 7 and the source wirings 8 in the frame section corresponding to a wiring region outside the effective display area (area in which the pixel electrodes 6 contributing to display are formed) of the liquid crystal panel P, the connecting section of the gate wirings and the connecting section of the source wirings are omitted in FIG. 1 for simplification. Although the liquid crystal 3 is sealed and surrounded by a sealant (not shown) formed in the peripheries of the substrates 1 and 2 and by the substrates 1 and 2, the structure of the sealant is also omitted in FIG. 1.

In the liquid crystal panel P having the structure shown in FIG. 1, wiring of the thin film transistor 9 and the periphery thereof are configured, for example, as shown in FIGS. 2 and 3. In the cross sectional structure shown in FIG. 2, a gate electrode 11 provided by extracting from a portion of the gate wiring 7 and the pixel electrode 6 are formed on the substrate 2, a gate insulating film 12 is formed so as to cover them, and an island-like semiconductor layer 13 is formed on the gate insulating film 12 over the gate electrode 11. A source electrode 15 and a drain electrode 16 are formed on both ends of the semiconductor layer 13 through an ohmic contact film 14. The source electrode 15 is connected to the source wiring 8, and the drain electrode 16 is connected to the pixel electrode 6 through a conducting section 17 which corresponds to a contact hole made in the gate insulating film 12. The contact section between the conducting section 17 and the pixel electrode 6 is a connecting section 6a, and an insulating film 18 is further formed so as to cover these sections. Although an alignment film is actually formed on the liquid crystal side of the substrate 2, the alignment film is omitted in FIG. 2.

In the frame section in the periphery of the liquid crystal panel P, with respect to the terminal section of the gate wiring 7, as shown in FIG. 2, an end 7a of the gate wiring 7 is covered by the gate insulating layer 12, and a gate terminal 6A composed of the transparent conductive film having the above-mentioned composition is formed on the substrate 2 outside the end 7a of the gate wiring 7. The gate terminal 6A and the gate end 7a are connected to each other by a connecting layer 20 composed of the same conductive material as that for the source wiring 8, and the portion thereof constitutes a connecting section 6b, and the connecting layer 20 is covered by the insulating film 18. The edge of the gate terminal 6A is connected to a gold pump 22 of an IC chip 21 by a conductive layer 23 composed of an anisotropic contact film (ACF) or the like, and this portion constitutes a connecting section 6c. By this configuration, COG wiring is realized.

Next, in the frame section in the periphery of the liquid crystal panel P, with respect to the terminal section of the source wiring 8, as shown in FIG. 3, a source terminal 6B composed of the transparent conductive film having the above-mentioned composition is formed in the end of the gate insulating film 12, the end of the source wiring 8 is connected to the source terminal 6B, and the above-mentioned film 18 is formed so as to cover these connecting sections. The edge of the source terminal 6B is connected to a gold pump 25 of an IC chip 24 by a conductive layer 26 composed of an anisotropic contact film (ACF) or the like. By this configuration, COG wiring is realized.

In the liquid crystal panel P having the above-mentioned configuration, the transparent conductive film and other conductors are connected to each other in any one of the following connection sections: the connecting section 6a in which the pixel electrode 6 is connected to the conducting section 17 of the drain electrode 16, the connecting section 6b in which the gate terminal 6A is connected to the connecting layer 20, and the connecting section 6c in which the gate terminal 6A is connected to the IC chip 21, which are shown in FIG. 2, a connecting section 6d in which the source terminal 6B is connected to the edge of the source wiring 8, and a connecting section 6e in which the source terminal 6B is connected to the IC chip 24, which are shown in FIG. 3. Since the pixel electrode 6, the gate terminal 6A and the gate terminal 6B are composed of the transparent conductive film, connection can be attained with a low connection resistance in any of the above-mentioned connection sections. In addition, since these connection sections are miniaturized with the miniaturization of the liquid crystal panel P, and the width thereof is getting smaller to about 5 to $40 \times 10^{-6}$, fully satisfactory connection can be realized in the configuration of a next-generation miniaturized panel in which the sizes of miniaturized connecting sections are further reduced.

In order to attain the configuration shown in FIGS. 2 and 3, after the transparent conductive film in the amorphous state is formed, the pixel electrode 6, the gate terminal 6A, and the source terminal 6B are formed by etching, and then connection to conductor sections of other layers is required to be performed. If the transparent conductive film having the above-mentioned composition is used, since weak acids, such as diluted hydrochloric acid or organic acids may be used as an etchant instead of strong acids, the side etching amount may be decreased, and thus a finer structure may be obtained by etching. After the pixel electrodes 6 or terminals 6A and 6B of predetermined sizes are formed by finely etching the transparent conductive film, if the film in the amorphous state is crystallized by heating at a temperature that is higher than the crystallization temperature, the resistance of the crystallized sections can be decreased. Thus, connection to the drain electrode 16 and connection to the IC chips 21 and 24 may be performed with low resistance. As described above, if the transparent conductive oxide film is etched in the amorphous state and then is crystallized to attain connection, the liquid crystal panel (electronic device) P provided with sections in which connection is performed with decreased connection resistance, even in fine wiring sections, may be obtained.

Figure 4:
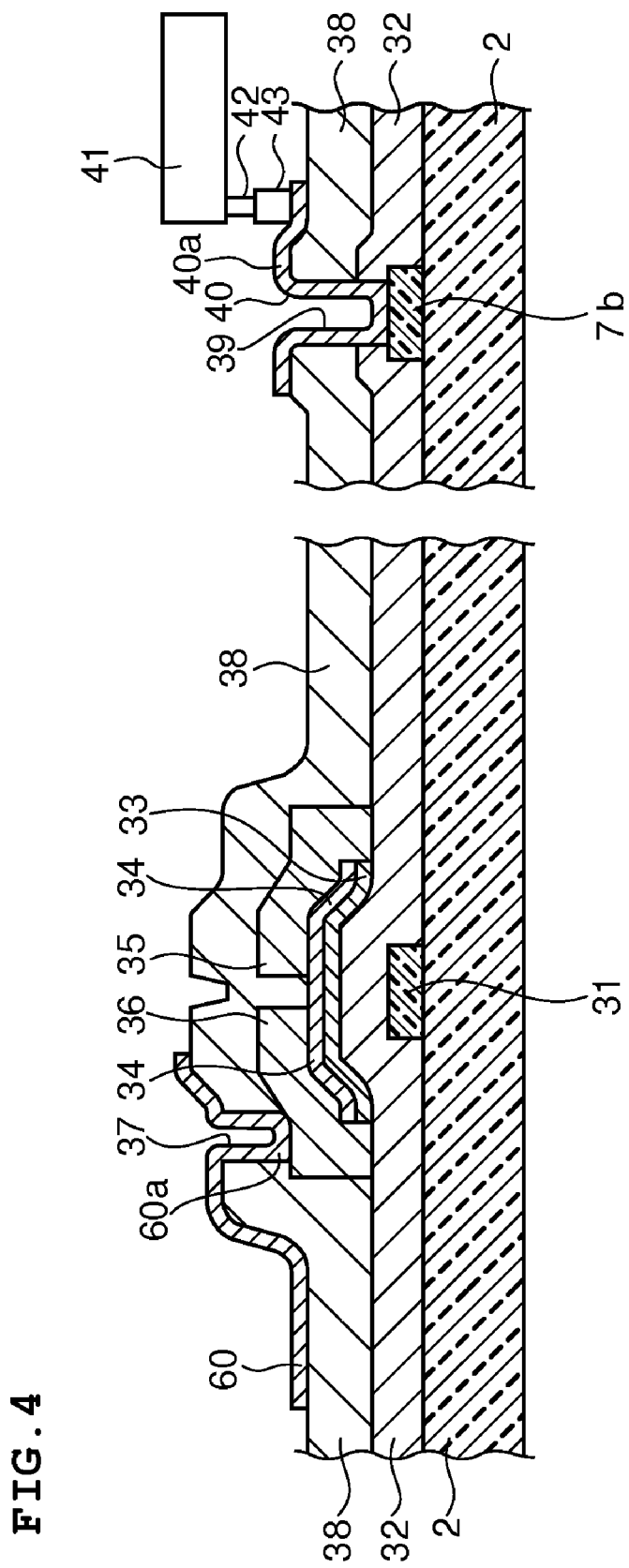
FIG. 4 is a sectional view showing a thin-film transistor and a gate terminal of a second example to be provided in the liquid crystal panel shown in FIG. 1.
Figure 5:
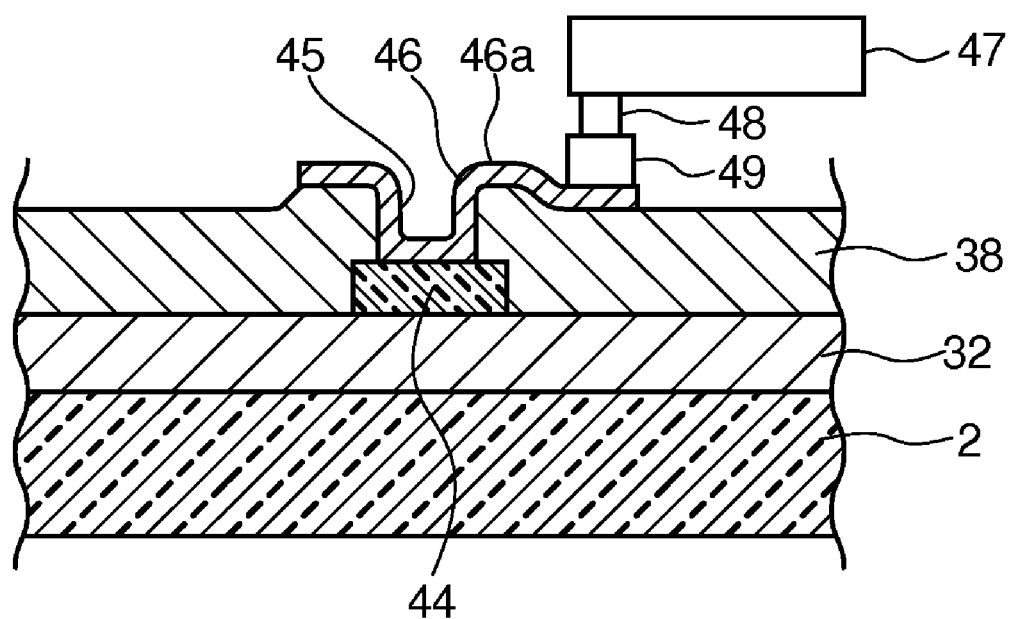
FIG. 5 is a sectional view showing a source terminal of the second example to be provided in the liquid crystal panel shown in FIG. 1.

FIGS. 4 and 5 show a second example of the wiring structure of the thin-film transistor 9 and the periphery thereof constituting the liquid crystal panel P. In the cross sectional structure shown in FIG. 4, a gate electrode 31 provided by extracting from a portion of the gate wiring 7 is formed on a substrate 2, a gate insulating film 32 is formed so as to cover them, and an island-like semiconductor layer 33 is formed on the gate insulating film 32 over the gate electrode 31. A source electrode 35 and a drain electrode 36 are provided on both ends of the semiconductor layer 33 through an ohmic contact film 34. The source electrode 35 is connected to the source film 34, and a pixel electrode 60 is formed on an insulating film 38 covering them. The drain electrode 36 is connected to a connecting section 60a of the pixel electrode 60 through a conducting section 37 which corresponds to a contact hole made in the insulating film 38.

Further, in the frame section in the periphery of the liquid crystal panel P, with respect to the terminal section of the source wiring 7, as shown in FIG. 4, an end 7b of the gate wiring 7 is covered by the gate insulating film 32 and the insulating film 38, and a gate terminal 40, which is composed of the same transparent conductive oxide film as the transparent conductive film constituting the pixel electrode 60, connected to the end 7b of the gate wiring 7, is formed so as to be embedded in a contact hole 39 made through the gate insulating film 32 and the insulating film 38. A connection portion 40a is formed in which a gold bump 42 of an IC chip 41 is connected to the end of the gate terminal 40 by a connecting layer 43 composed of an ACF (anisotropic conductive film) or the like. By this configuration, COG wiring can be realized.

Next, in the frame section in the periphery of the liquid crystal panel P, with respect to the terminal section of the source wiring 8, as shown in FIG. 5, a source terminal 44, which is composed of the same conductive material constituting the source electrode 36 and the drain electrode 35, is formed on the gate insulating film 32. A source terminal 46, which is composed of the transparent conductive oxide material having the same composition as mentioned above, is formed at a contact hole 45 made through the insulating film 38 on the source terminal 44.

A connection portion 46a is formed in which a gold bump 48 of an IC chip 47 is connected to the source terminal 46 by a connecting layer 49 composed of an ACF (anisotropic conductive film) or the like. By this configuration, COG wiring can be realized.

In order to attain the configuration shown in FIGS. 4 and 5, after the transparent conductive film is formed, the pixel electrode 60, the gate terminal 40, and the source terminal 46 are formed by etching, and then connection is performed. If the transparent conductive film having the above-mentioned composition is used, since weak acids may be used as an etchant instead of strong acids, the side etching amount can be decreased, and thus a finer structure may be attained. After forming the pixel electrode 60 or terminals 40 and 46 of predetermined sizes by performing fine etching, if the amorphous film is crystallized by heating at a temperature higher than the crystallization temperature, the resistance of the crystallized sections may be decreased. Thus, connection to the drain electrode 36 and connection to the IC chips 41 and 47 may be performed with low resistance. As mentioned above, if the transparent conductive film is etched in the amorphous state and then crystallized to perform connection, the liquid crystal panel (electronic device) P provided with sections in which connection is performed with a decreased connection resistance, even in fine wiring sections, may be obtained.

Although a liquid crystal panel is described as an example of the electronic devices in the above-mentioned embodiments, it is to be understood that the transparent conductive film of the invention can be applied to a wide variety of electronic devices which require transparent conductive films other than the liquid crystal panel.

EXAMPLES

Example 1

Using a target with a composition of In:Sn:Sm of 90 atomic %:7 atomic %:3 atomic %, a 800 Å-thick indium-tin-samarium oxide film "$In_2O_3$—$SnO_2$—$Sm_2O_3$ film" (ITSO film) was formed on a glass substrate at 180° C. and at an oxygen partial pressure of $3\times10^{-3}$ Pa ($5\times10^{-5}$ Torr) using a sputtering apparatus. As a result of the elementary analysis by ICP (Inductively Coupled Plasma) analysis, the resulting ITSO film had almost the same composition as that of the target used in film formation. The X-ray diffraction pattern of the film revealed that, when film was formed at 180° C., the ITSO film was an amorphous film which shows a broad curve.

The indium tin samarium film was subjected to thermal treatment at each of temperatures ranging from 180 to 300° C. for 30 minutes in the air, and an X-ray diffraction pattern was obtained for each case. The results are shown in FIG. 6.

Figure 6:
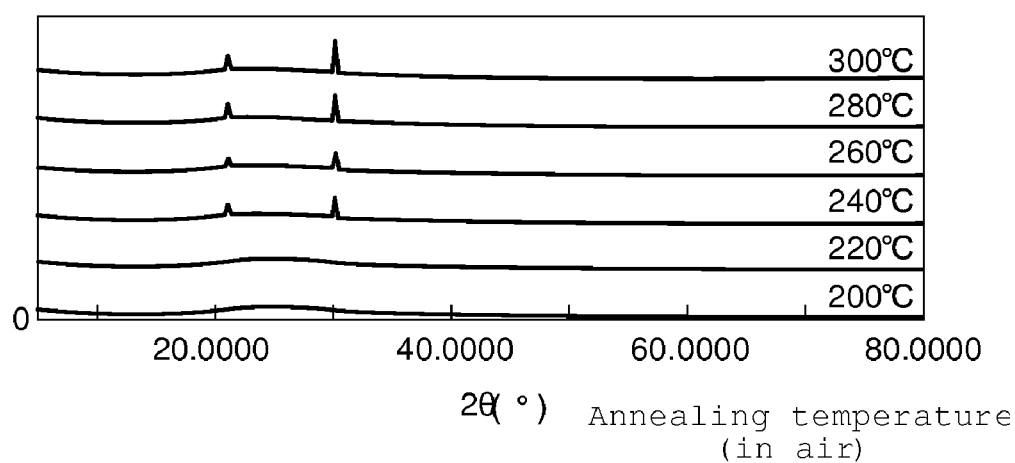
FIG. 6 shows the results of X-ray diffraction analysis of an ITSO film.

The results shown in FIG. 6 revealed that the ITSO film was crystallized when subjected to thermal treatment. From the above, it was understood that the ITSO film having the composition of the invention was in the amorphous state as deposited, but could be crystallized by thermal treatment. While the ITSO film as deposited which was in the amorphous state had a resistance of $600\times10^{-6}$ Ω·cm, it had a resistance of $250\times10^{-6}$ Ω·cm after thermal treatment. It was confirmed that the resistance decreased by changing from the amorphous state to the crystalline state.

Comparative Example 1

Using a target with a composition of In:Sn of 90 atomic %:10 atomic %, a 800 Å-thick indium-tin-oxide film (ITO film) was formed on a glass substrate at room temperature and at an oxygen partial pressure of $3\times10^{-3}$ Pa ($5\times10^{-5}$ Torr) using a sputtering apparatus. The X-ray diffraction peaks of the film were obtained, and the results are shown in FIG. 7.

Figure 7:
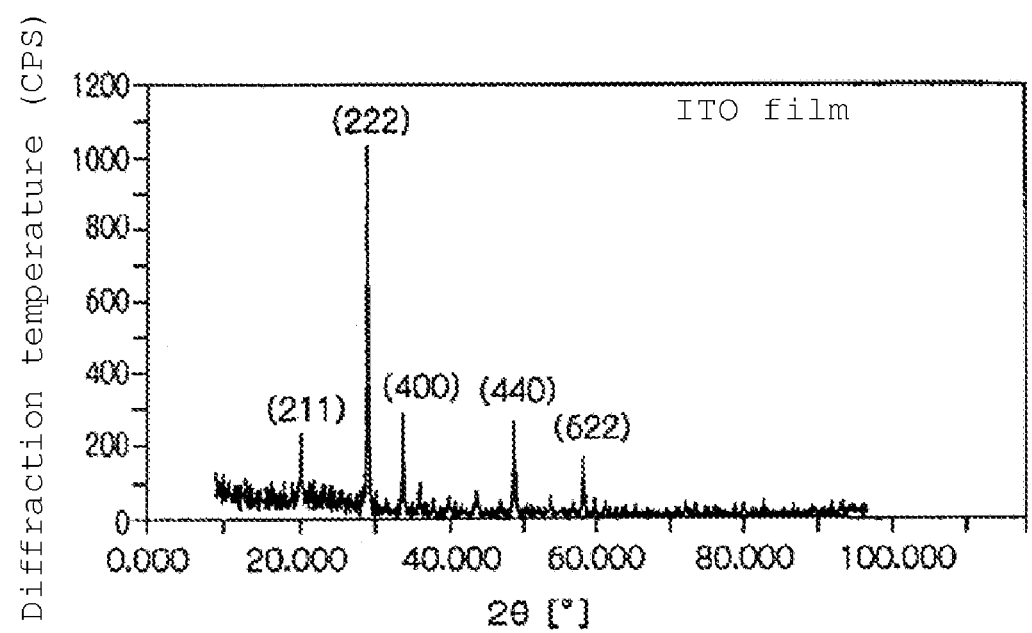
FIG. 7 shows the results of X-ray diffraction analysis of an ITO film.

The results shown in FIG. 7 revealed that the ITO film was a crystalline film when film formation was performed at room temperature.

Comparative Example 2

Using a target with a composition of In:Zn of 83 atomic %:17 atomic %, a 800 Å-thick indium-zinc-oxide film (IZO film) was formed on a glass substrate at room temperature and at an oxygen partial pressure of $3\times10^{-3}$ Pa ($5\times10^{-5}$ Torr) using a sputtering apparatus. As a result of analysis of the resulting IZO film, In:Zn was 82 atomic %:18 atomic %. The X-ray diffraction peak of the resulting film was obtained and shown in FIG. 8.

The resulting IZO film was heated at 250° C. for 2 hours in an annealing kiln with an atmosphere of 20% $H_2$/80% $N_2$. The X-ray diffraction peak of the thermal-treated film was obtained and shown in FIG. 8.

Figure 8:
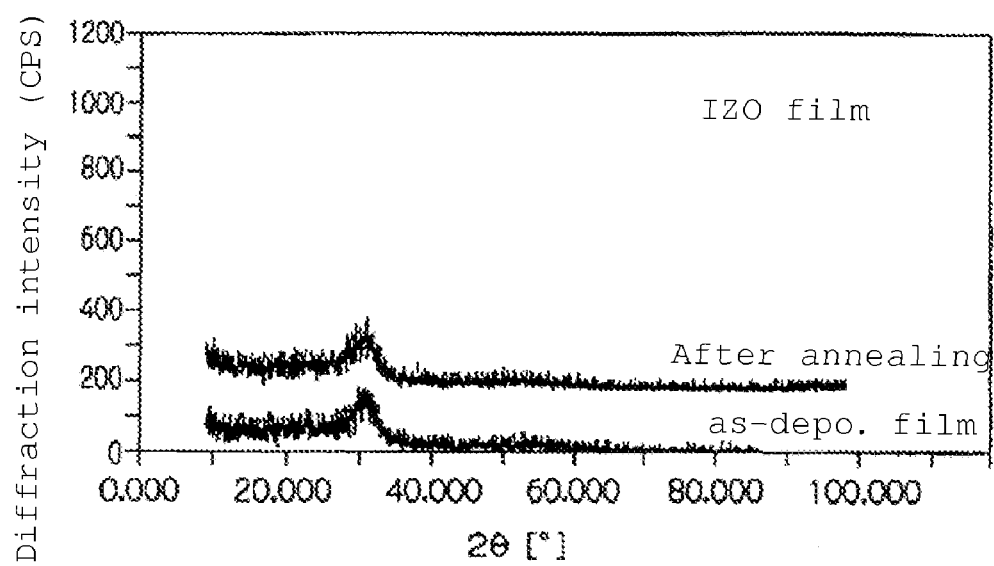
FIG. 8 shows the results of X-ray diffraction analysis of an IZO film.

The results shown in FIG. 8 revealed that the IZO film was an amorphous film showing a broad curve. Also, it was revealed that the IZO film was not crystallized even after thermal treatment.

Evaluation Example

The following evaluation was conducted using the ITSO film, the ITO film and the IZO film obtained in Example 1 and Comparative Examples 1 and 2.

(1) COG Connection Reliability

Figure 9:
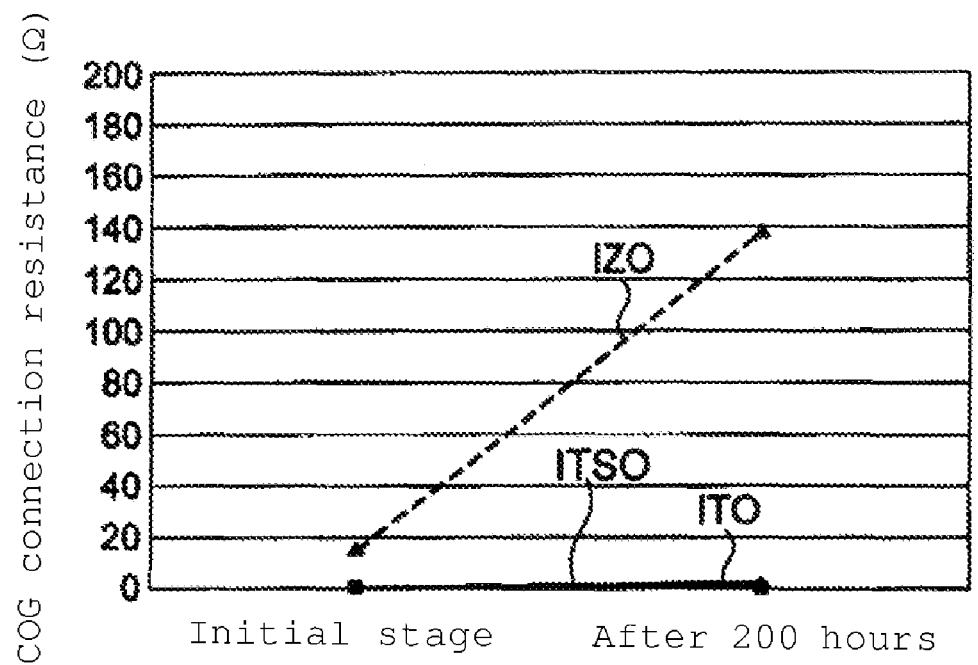
FIG. 9 shows the connection resistance values of an ITSO film, an ITO film and an IZO film after 125 hours.

The ITSO film after thermal treatment, the ITO film without thermal treatment and the IZO film after thermal treatment obtained in Example 1, and Comparative Examples 1 and 2 were connected to an IC chip with a bump with an ACF, and the connection resistance after 125 hours was measured at a temperature of 60° C. and a humidity of 95%. The results are shown in FIG. 9.

(2) Crystallization Temperature

The X-ray diffraction data obtained by subjecting the ITSO film in the amorphous state to thermal treatment at 180° C. to 300° C. for 30 minutes in air in an annealing kiln are shown in FIG. 6. The film was judged to be crystallized when a peak derived from an indium oxide appeared.

(3) Specific Resistance Value with Annealing Temperature

Figure 10:
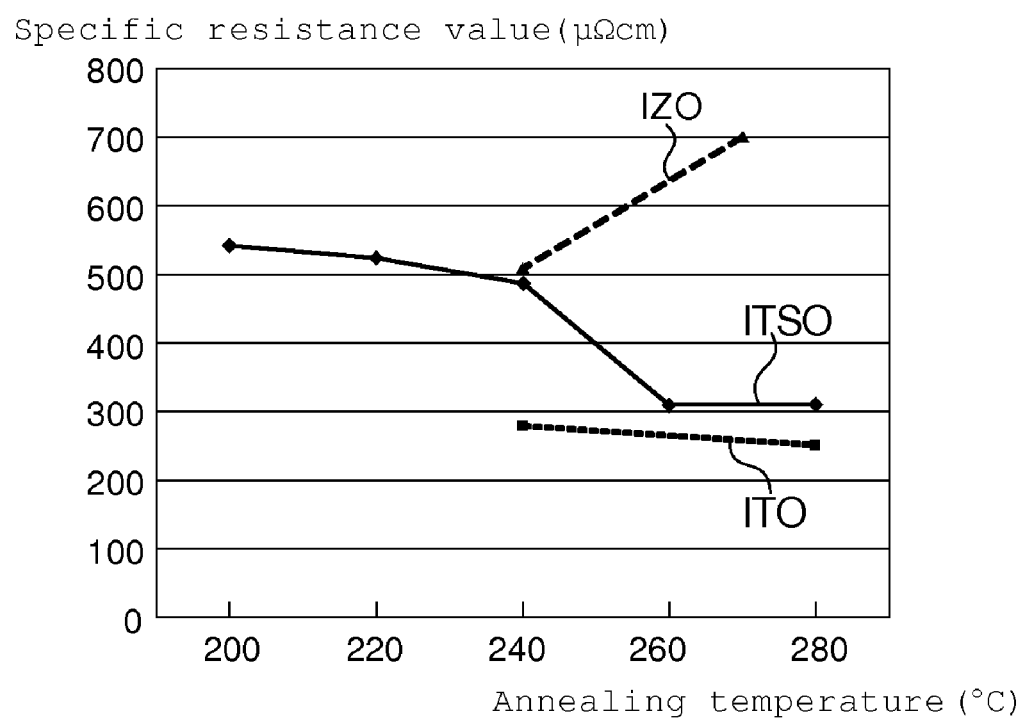
FIG. 10 shows specific resistance values of an ITSO film, an ITO film and an IZO film after thermal treatment.

Each film as deposited (without thermal treatment) was subjected to thermal treatment at 200° C. to 280° C. for 30 minutes in air in an annealing kiln, and the specific resistance value was measured. The results are shown in FIG. 10.

(4) Transmittance

Figure 11:
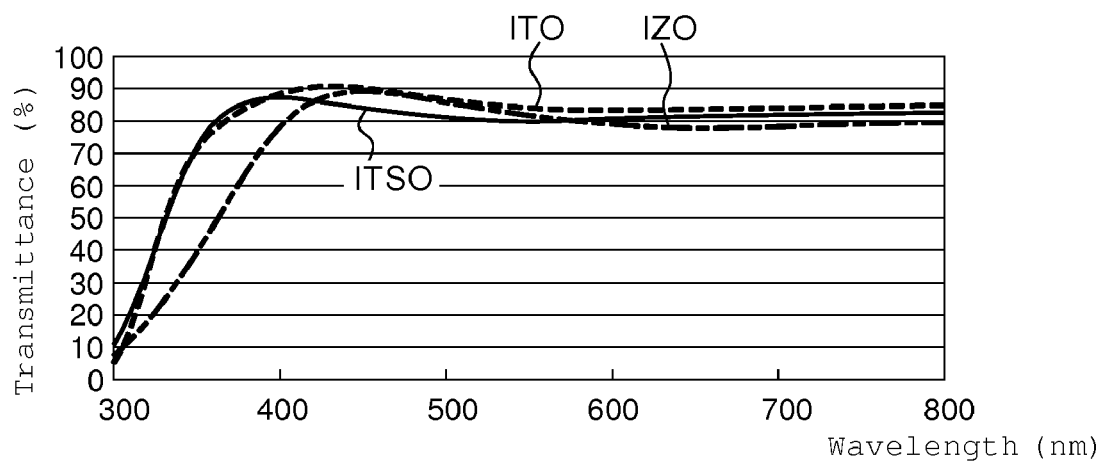
FIG. 11 shows a view showing transmittance values of an ITSO film, an ITO film and an IZO film.

Each film as deposited (without thermal treatment) was subjected to thermal treatment at 280° C. for 2 hours in air in an annealing kiln, and the transmittance at 300 nm to 800 nm was measured. The results are shown in FIG. 11.

(5) Etching Rate

Figure 12:
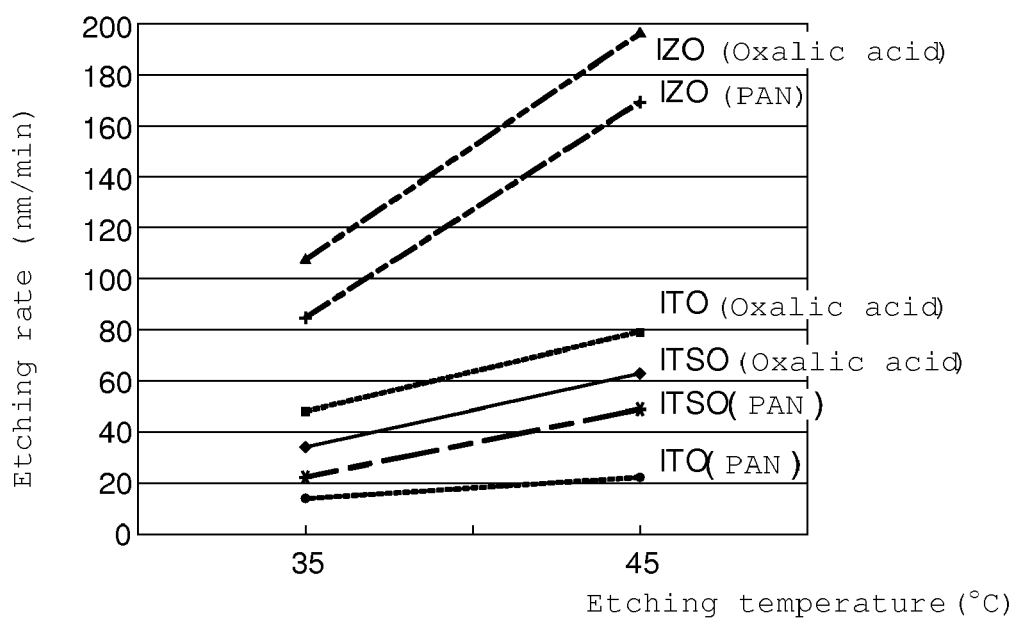
FIG. 12 shows etching rates of an ITSO film, an ITO film and an IZO film.

The ITSO film before thermal treatment, the ITO film without thermal treatment and the IZO film before thermal treatment obtained in Example 1, and Comparative Examples 1 and 2 were etched at 35° C. to 45° C. with oxalic acid (oxalic acid 5%, water 95%) and PAN (phosphoric acid 87%, acetic acid 10%, nitric acid 3%), and the etching rate was measured. The results are shown in FIG. 12.

(6) Etching Residue

The ITSO film before thermal treatment, the ITO film without thermal treatment and the IZO film before thermal treatment obtained in Example 1, and Comparative Examples 1 and 2 were etched at 45° C. with oxalic acid (oxalic acid 5%, water 95%). As a result of the measurement of the etching residues, a large amount of etching residues was observed in the ITO film. No etching residues were observed in the ITSO film as well as in the IZO film, showing good etching performance.

(7) Evaluation of Etching Properties

The ITSO film before thermal treatment obtained in Example 1 was etched at 35° C. with an etchant containing oxalic acid (oxalic acid 5%, water 95%). After etching, the cross section was observed by means of microscope to measure the taper angle. The taper angle was 80 degrees.

(8) Evaluation on Adhesion of Transparent Conductive Film and Metal

The ITSO film after thermal treatment obtained in Example 1 was evaluated for adhesion to molybdenum by scratch test. As a result, the AE-signal-rising load was 17N and the load at which cracking of the film started was 17N, showing that the ITSO film had good adhesion to molybdenum.

The conditions of the scratch test were as follows: Scratch test machine: Micro-Scratch-Testeer manufactured by CSEM
Scratch distance: 20 mm
Scratch load: 0 to 30N
Loading rate: 30 N/min
Scratching rate: 20 mm/min
Shape of diamond needle: 0.2 mmR
Detection method: Load cell and AE sensor (9) Evaluation of Electrochemical Properties of Transparent Conductive Film The immersion potential of the ITSO film before thermal treatment obtained in Example 1 in an aqueous TMAH (tetramethyl ammonium hydroxide) solution was measured using a saturated silver/silver chloride electrode, and it was found to be −4.2V.

The results of (1) to (6) above are summarized in Table 1. As is apparent from the table, since the ITSO film in Example 1 had a stable amorphous structure during film formation at a film forming temperature of 180° C. or less, it exhibited excellent etching performance leaving no etching residues as in the case of IZO. Furthermore, by crystallization at an annealing temperature of 180° C. or higher, the poor terminal connection reliability of IZO, which was a defect of IZO, could be improved.

INDUSTRIAL APPLICABILITY

The transparent conductive film of the invention can be used in electronic devices including a liquid crystal display, an organic or inorganic display, a PDP display and an SED display.

The invention claimed is:

1. A transparent conductive film comprising an indium oxide, a tin oxide and at least one lanthanoid metal oxide,
the film containing the indium oxide in an amount of 70 atomic % to 95 atomic %,
the film comprising a portion for connection to a conductor, and
at least the connection portion having crystallinity.

2. The transparent conductive film according to claim 1, wherein the lanthanoid metal oxide is a cerium oxide and/or a samarium oxide.

3. The transparent conductive film according to claim 2, which has the following metal component ratios in terms of atomic %, $$Sn/(In+Sn+Ce(and/or\ Sm))=0.03\ to\ 0.2\ and$$

$$Ce(and/or\ Sm)/(In+Sn+Ce(and/or\ Sm))=0.001\ to\ 0.2.$$

4. The transparent conductive film according to claim 1, which has a crystallization temperature of 160 to 300° C.

5. A transparent electrode according to claim 1, which has a taper angle of 30 to 89 degrees.

6. An electronic device comprising the transparent conductive film according to claim 1 as at least part of an electrical circuit.

7. A transparent-conductive-film-formed substrate comprising a substrate and the transparent conductive film according to claim 1 formed thereon.

8. A method for producing the transparent-conductive-film-formed substrate according to claim 7, comprising:
forming an amorphous transparent conductive film comprising an indium oxide, a tin oxide and at least one lanthanoid metal oxide,
subjecting the amorphous transparent conductive film to a thermal treatment to crystallize at least part of the amorphous transparent conductive film.

9. A liquid crystal display comprising a pair of opposing substrates and a liquid crystal between the substrates, at least one of the substrates being the transparent-conductive-firm-formed substrate according to claim 7.

TABLE 1

| | Composition | COG connection reliability | Crystallization temperature (° C.) | Specific resistance after 280° C. annealing (μΩ·cm) | Transmittance (300° C. annealing) @ 550 nm Ref: Air | Etching rate at 45° C. with oxalic acid (nm/min) | Residue |
|---|---|---|---|---|---|---|---|
| Example 1 | ITSO | Excellent | 180 to 280 | 310 | 80% | 63 | Good |
| Comparative Example 1 | ITO | Excellent | −150 | 260 | 84% | 80 | Poor |
| Comparative Example 2 | IZO | Poor | >340 | 700 | 81% | 198 | Excellent |

10. A transparent conductive film comprising an indium oxide, a tin oxide and at least one lanthanoid metal oxide,
the film comprising a portion for connection to a conductor, and
at least the connection portion having crystallinity,
wherein the lanthanoid metal oxide is a cerium oxide and/or a samarium oxide, and which film has the following metal component ratios in terms of atomic %, In/(In+Sn+Ce(and/or Sm))=0.6 to 0.969

Sn/In+Sn+Ce(and/or Sm))=0.03 to 0.2 and

Ce(and/or Sm)/(In+Sn+Ce(and/or Sm))=0.001 to 0.2.

11. A transparent conductive film comprising an indium oxide, a tin oxide and at least one lanthanoid metal oxide,
the film comprising a portion for connection to a conductor, and
at least the connection portion having crystallinity,
which film has a taper angle of 30 to 89 degrees.

12. A transparent-conductive-film-formed substrate comprising a substrate and the transparent conductive film according to claim 10 formed thereon.

13. A transparent-conductive-film-formed substrate comprising a substrate and the transparent conductive film according to claim 11 formed thereon.

14. A liquid crystal display comprising a pair of opposing substrates and a liquid crystal between the substrates, at least one of the substrates being the transparent-conductive-firm-formed substrate according to claim 12.

15. A liquid crystal display comprising a pair of opposing substrates and a liquid crystal between the substrates, at least one of the substrates being the transparent-conductive-firm-formed substrate according to claim 13.

16. A transparent electrode according to claim 10, which has a taper angle of 30 to 89 degrees.

17. The transparent conductive film according to claim 1, which contains tin oxide in an amount of 3 atomic % to 20 atomic %.

18. The transparent conductive film according to claim 1, which contains tin oxide in an amount of 5 atomic % to 15 atomic %.

19. The transparent conductive film according to claim 1, which contains tin oxide in an amount of 15 atomic % to 20 atomic %.

20. The transparent conductive film according to claim 1, wherein the lanthanoid metal oxide is a samarium oxide.

* * * * *